United States Patent [19]

DeTorre

[11] Patent Number: 4,466,562
[45] Date of Patent: Aug. 21, 1984

[54] METHOD OF AND APPARATUS FOR SEVERING A GLASS SHEET

[75] Inventor: Robert P. DeTorre, Pittsburgh, Pa.

[73] Assignee: PPG Industries, Inc., Pittsburgh, Pa.

[21] Appl. No.: 331,104

[22] Filed: Dec. 15, 1981

[51] Int. Cl.³ .............................................. B26F 3/00
[52] U.S. Cl. ....................................................... 225/2
[58] Field of Search ..................... 225/2, 3, 4, 96.5, 97

[56] References Cited

U.S. PATENT DOCUMENTS

| | | | |
|---|---|---|---|
| 3,215,345 | 11/1965 | Ferguson | 225/93.5 |
| 3,717,290 | 2/1973 | Bentley et al. | 225/2 |
| 3,865,673 | 2/1975 | DeTorre | 225/2 |
| 3,998,616 | 12/1976 | Farabaugh | 65/29 |
| 4,057,184 | 11/1979 | Michalik | 225/2 |
| 4,140,820 | 2/1979 | DeTorre | 225/2 |
| 4,196,830 | 4/1980 | Oravitz et al. | 225/2 |
| 4,225,070 | 9/1980 | Dahlberg et al. | 225/2 |
| 4,285,451 | 8/1981 | Ferraino | 225/2 |
| 4,291,824 | 9/1981 | DeTorre | 225/2 |

Primary Examiner—E. R. Kazenske
Assistant Examiner—Paul M. Heyrana, Sr.
Attorney, Agent, or Firm—Donald Carl Lepiane

[57] ABSTRACT

A subsurface score is imposed in one surface of a glass ribbon at the bulb edge and an open score imposed in the opposite surface aligned with the subsurface score. The ribbon is cut into lehr ends after which bending moment forces are applied about the scores to propagate the open score toward the subsurface score to sever the bulb edge from the ribbon to provide a glass sheet having substantially smooth cut edges.

16 Claims, 6 Drawing Figures

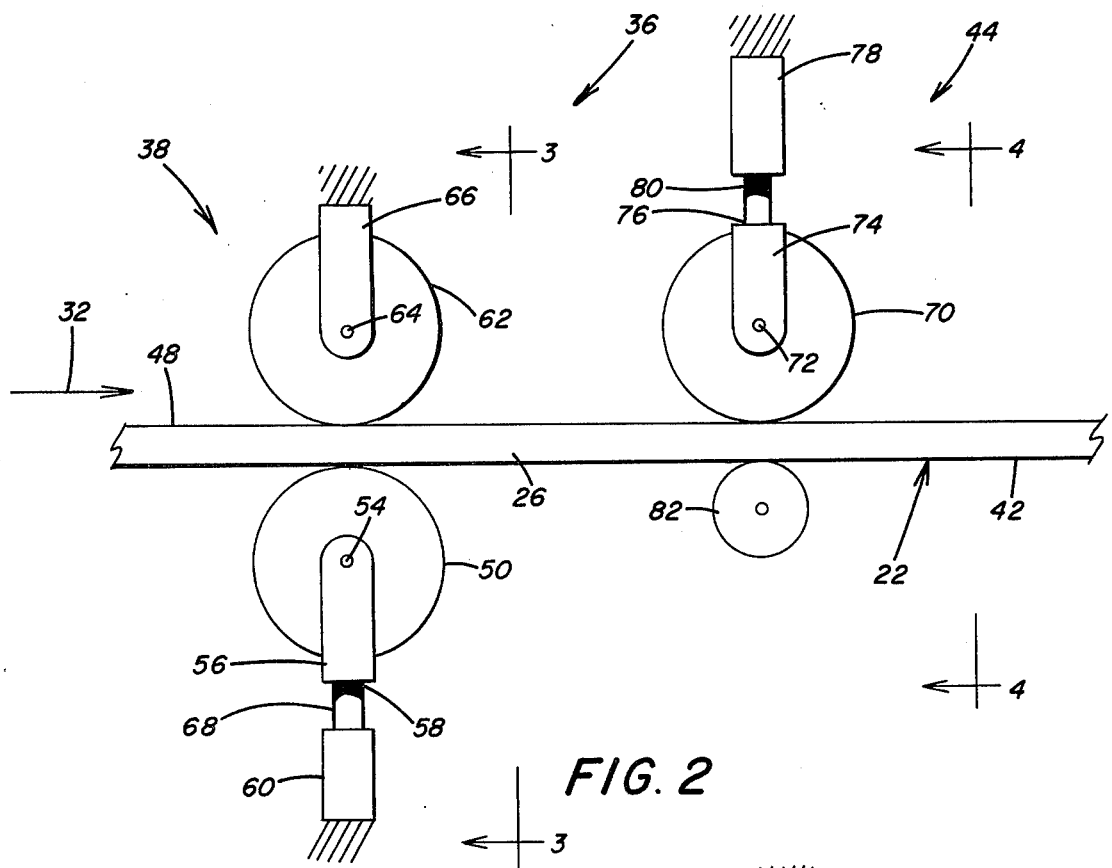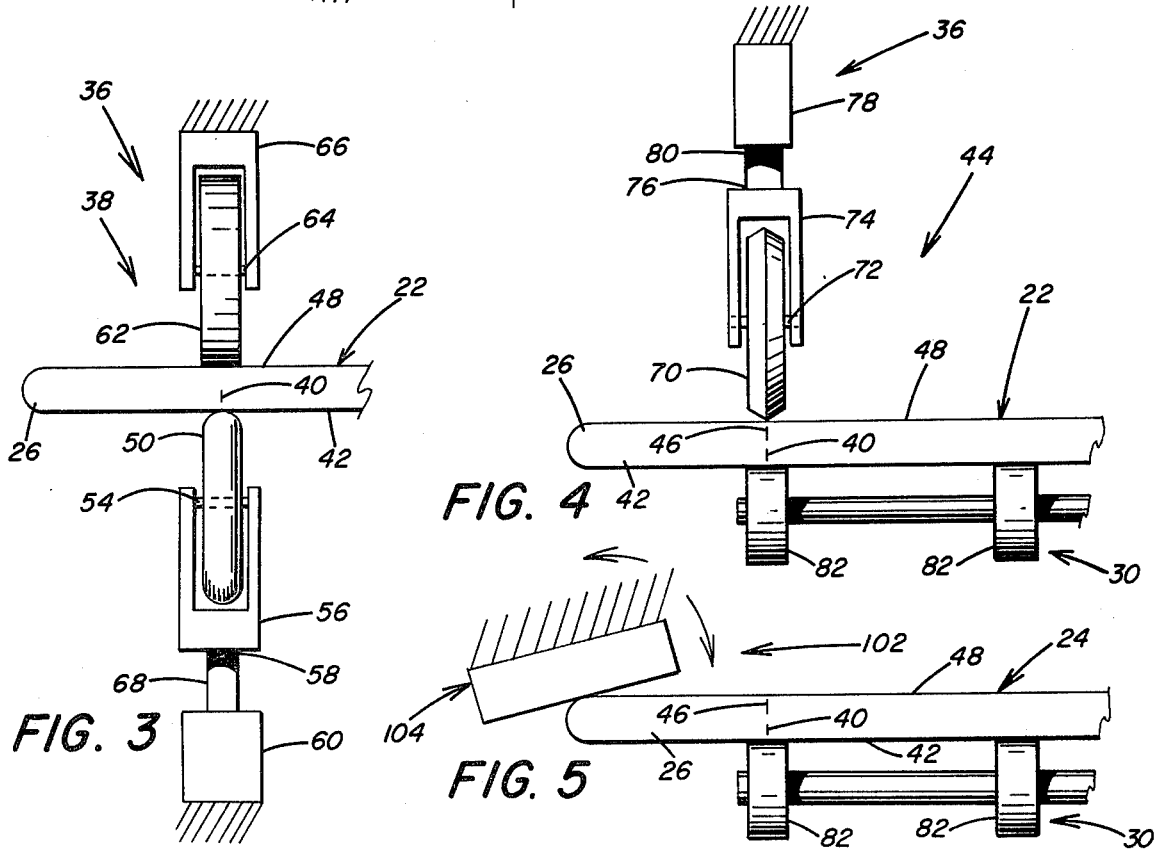

METHOD OF AND APPARATUS FOR SEVERING A GLASS SHEET

BACKGROUND OF THE INVENTION

1. Field of the Invention

This invention relates to a method of and apparatus for severing a sheet of refractory material and, more particularly, to scoring bulb edges of a glass ribbon for subsequent removal.

2. Discussion of the Technical Problems

As taught in U.S. Pat. No. 3,998,616 in the manufacture of a glass ribbon by the float method, a continuous ribbon of molten glass is controllably cooled as it moves through a forming chamber on a pool of molten metal. The ribbon exits the chamber as a dimensionally stable continuous ribbon. During the forming of the ribbon, the edges of the molten glass are selectively acted on when a ribbon thickness other than equilibrium thickness, e.g., about 0.27 inch (0.686 centimeter) is desired. For example, for ribbon thicknesses less than equilibrium thickness, as the molten glass moves through the forming chamber the edges are contacted by attenuating machines to move the edges away from one another. The glass ribbon, after exiting the forming chamber, moves through an annealing lehr and is thereafter cut into sections, usually called lehr ends.

The edges of the annealed ribbon usually referred to as bulb edges, are removed because they are areas of high stress and of unacceptable optical quality. In one bulb edge removal technique the ribbon is scored in areas of low stress, e.g., about 10 inches (25.4 centimeters) in from the ribbon edge to attain a smooth cut edge. A smooth cut edge is preferred for ease of storing and for safe handling of the glass. Although the above technique gives a relatively smooth cut edge, the ribbon width reduction of 20 inches (0.508 meter) is uneconomical.

In another technique, two scores are imposed in each bulb edge with the first score spaced about 3 inches (7.62 centimeters) from the adjacent ribbon edge and a second score spaced about 2.5 inches (0.98 centimeter) from the first score, i.e., about 5.5 inches (2.17 centimeters) from the adjacent ribbon edge. The score closest to the ribbon edge is opened first and usually the resultant cut edge is jagged because of the high stress level of the scored edges. Initial removal of the bulb edge at the first score reduces the stress level such that opening the second score yields a relatively smooth cut edge. A technique employing two scores to remove the bulb edge of a glass ribbon or a lehr end is taught in U.S. Pat. No. 4,285,451 which teachings are hereby incorporated by reference. Although the above technique provides a relatively smooth cut edge while maximizing the ribbon width, a limitation is the equipment and time required for imposing two scores in each of the bulb edges and sequentially opening each score.

In still another technique, identical scores are imposed in each opposed surface of the ribbon at each of the bulb edges. If the two scores at the bulb edge are perfectly aligned with one another, i.e., the score in the top surface of the glass ribbon is perfectly aligned with the score in the bottom surface of the ribbon, the resultant cut edge is smooth. However, if they are not aligned, the two scores do not interact with one another and the scores randomly open, i.e., each score opens as if the other was not present. The result is an uneven and unpredictable cut edge.

As can now be appreciated, it would be advantageous to provide a bulb edge removal technique that does not have the drawbacks of the presently available techniques.

SUMMARY OF THE INVENTION

This invention relates to a method of severing a refractory material having a pair of opposed surfaces, e.g., an advancing glass ribbon having bulb edges. The method includes the steps of imposing a subsurface score in one surface and an open score in the opposite surface in general alignment with the subsurface score. More particularly, a subsurface score is imposed in the bottom surface of the advancing glass ribbon followed by imposing an open score in the upper surface of the glass ribbon. Thereafter, a bending moment is applied about the scores to sever the refractory material. For example, the glass ribbon having scored bulb edges advances downstream through a cross-scoring station where the ribbon is cross-scored and subsequentally the cross-scores opened to provide lehr ends. A bending moment is thereafter applied to the bulb edges to propagate the open score further into the glass. As the open score propagates into the glass, it interacts with the subsurface score to sever the bulb edge from the glass ribbon to provide a relatively smooth cut edge.

This invention also relates to an apparatus for practicing the above method of severing the bulb edges of a glass ribbon.

Practicing the instant invention (1) maximizes the width of the ribbon; (2) provides a relatively smooth cut edge and (3) eliminates random opening of the scores at the bulb edge. The preceding is accomplished by imposing one type of a score in the ribbon, e.g., a subsurface score in one surface of the ribbon and an open score in the opposite surface generally aligned with the subsurface score. A subsurface score is one that does not extend to either surface of the glass and is within the body of the glass. Preferably, the subsurface score has a depth of about 25 percent of the glass thickness. An open score is a score that is generated at the surface contacted by scoring facilities and extends into the glass thickness. Preferably, the open score has a shallow depth, e.g., from about 4%-20% of the glass thickness to prevent premature opening and interaction with the subsurface score to randomly sever the bulb edge from the ribbon. By providing a relatively deep subsurface score which does not self-propagate and a relatively shallow open score, the bulb edge is maintained on the ribbon as it advances through the cross-scoring station. The open score and subsurface score interact with one another even though they are not perfectly aligned to provide a substantially smooth cut edge. It is believed that the different type of scores interact with one another because the subsurface score is dormant until the open score propagates into the subsurface score. In this manner, the scores do not act independent of one another, but act in concert.

BRIEF DESCRIPTION OF THE DRAWINGS

FIG. 2 is a side, elevated view of a bulb edge scoring position incorporating features of the invention and having portions removed for purposes of clarity;

FIG. 3 is a view taken along line 3—3 of FIG. 2;

FIG. 4 is a view taken along line 4—4 of FIG. 2; and

FIG. 5 is a partial front view of a score opening member for removing scored bulb edges from a lehr end.

DESCRIPTION OF THE INVENTION

Figure 1A:
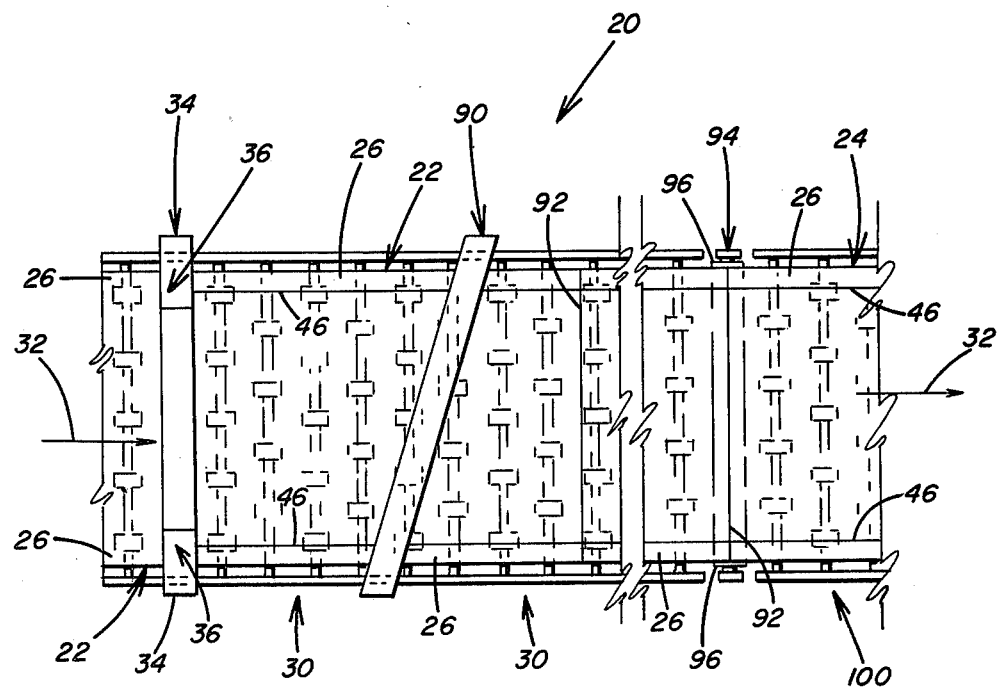
FIGS. 1A and 1B are fragmented plan views of a station for severing a glass ribbon into lehr ends and thereafter removing the bulb edges from the lehr ends in accordance with the teachings of the invention.
Figure 1B:
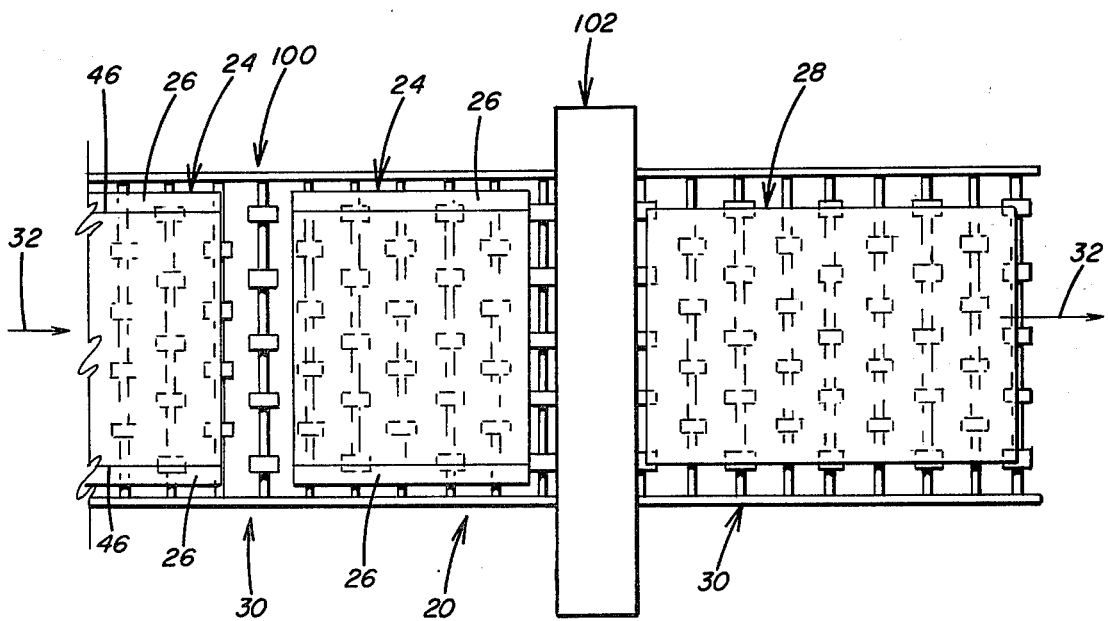

Shown in FIGS. 1a and 1b is a station 20 for severing an advancing annealed glass ribbon 22 into lehr ends 24 and thereafter removing bulb edges 26 from each side of the lehr ends 24 to provide uncuts, or glass sheets 28. In general, the glass ribbon 22 formed in any convenient manner, e.g., in the manner taught in U.S. Pat. No. 3,998,616, which teachings are hereby incorporated by reference, advances along conveyor 30 in the direction of the arrow 32 through a bulb edge scoring position 34. With reference to FIGS. 2-4, mounted at each side of the scoring position 34 is a scoring apparatus 36 incorporating features of the invention which includes a subsurface scoring device 38 for imposing a subsurface score 40 in the bulb edge 26 of the ribbon, e.g., adjacent bottom ribbon surface 42 as shown in FIGS. 2-4, and an open scoring device 44, see FIGS. 2 and 4, for imposing an open score 46 in the opposite ribbon surface, e.g., upper ribbon surface 48 generally aligned with the subsurface score 40 as shown in FIG. 4.

A subsurface score, as the term is used herein, includes a pseudosubsurface score and refers to a discontinuity or fracture that is within the thickness of the glass piece and does not extend to a major surface of the glass and is essentially free of wing and spall. Subsurface scores and pseudosubsurface scores are discussed in detail in U.S. Pat. Nos. 3,856,294; 3,856,673 and 4,057,184, which teachings are hereby incorporated by reference. With reference to FIGS. 2 and 3, the subsurface scoring device 38 includes a scoring wheel 50 freely rotatable on a shaft 54 captured in a housing or stem 56. The housing 56 is mounted on piston end 58 of stationary ram or cylinder 60 to move the wheel 50 toward and away from the ribbon surface 42. Mounted on the other side of the ribbon surface, i.e., over the upper ribbon surface 48 aligned with the scoring wheel 50 is a land 62, e.g., a wheel 62 freely rotatable on shaft 64 mounted in stationary housing or stem 66. In practice, piston 68 moves out of the cylinder 60 to urge the scoring wheel 50 toward the land 62 to engage the bottom surface 42 of the ribbon 22 and to pinch the bulb edge 26 therebetween to impose the subsurface score 40 in the bulb edge 26 adjacent the bottom ribbon surface 42.

The depth or length of the subsurface score or fissure 40 as measured between the ribbon surface 48 and 42 is not limiting to the invention; however, it is recommended that the subsurface score 40 preferably extends into or terminates near the tension zone of the glass ribbon 22. In this regard, it is generally accepted that a glass ribbon or sheet has an internal tension zone, approximately 50%-60% of the glass thickness between a pair of outer compression zones, each approximately 20%-25% of the glass thickness. The subsurface score 40 in accordance with the teachings of the invention can have a depth of up to 75% of the glass ribbon thickness, but preferably has a depth of about 25% of the glass ribbon thickness. The shallower depth is preferred because as the depth of the subsurface score increases, the bending moment forces required to open the score decreases. Therefore, a shallower depth, i.e., 25% of the glass thickness minimizes, if not eliminates, the possibility of the bulb edge severing from the ribbon due to ribbon vibration. These ribbon vibrations may result from the ribbon advancing on the conveyor 30; from cross-scoring the ribbon and/or from subsequent snapping of the ribbon into lehr ends to be discussed below. If the bulb edge having only the subsurface score should open, the resultant cut edge could be jagged. The spacing between the subsurface score and the ribbon surface contacted by the scoring wheel 50 is not limiting to the invention and can be expected to be about 0.001 inch (0.0254 millimeter).

A subsurface score initiates immediately at a zone of damage in the glass surface. The zone of damage may be generated by initially urging the scoring wheel against the ribbon surface under a load 20% greater than the expected scoring load. The zone of damage may also be made with a device other than the scoring wheel used to subsurface score the ribbon, e.g., as taught in U.S. Pat. Nos. 4,213,550; 3,979,243 and 4,057,184, which teachings are hereby incorporated by reference.

Table I provides parameters that may be used for subsurface scoring glass ribbons or sheets of different thicknesses.

TABLE I

SUBSURFACE SCORING PARAMETERS FOR A GLASS RIBBON THICKNESS

| | GLASS RIBBON THICKNESS | | |
|---|---|---|---|
| | ⅛ inch (0.318 centimeter) | ¼ inch (0.635 centimeter) | ¾ inch (1.91 centimeters) |
| MAJOR SCORING WHEEL DIAMETER | ¾ inch (1.91 centimeters) | 2 inches (5.08 centimeters) | 5 inches (12.7 centimeters) |
| RADIUS OF WHEEL SCORING SURFACE | 0.008 inch (0.20 millimeter) | 0.010 inch (0.25 millimeter) | 0.015 inch (0.38 millimeter) |
| SCORING FORCE | 125 pounds (56.7 kilograms) | 200 pounds (90.72 kilograms) | 400 pounds (181.44 kilograms) |
| EXPECTED SCORE DEPTH | 0.050 inch (0.127 centimeter) | 3/32 inch (0.159 centimeter) | ¼ inch (0.635 centimeter) |
| RECOMMENDED MAXIMUM RIBBON SPEED | 600 inches per minute (15.24 meters | 400 inches per minute (10.16 meters | 300 inches per minute (7.62 meters |

TABLE I-continued

SUBSURFACE SCORING PARAMETERS
FOR A GLASS RIBBON THICKNESS

| | GLASS RIBBON THICKNESS | | |
|---|---|---|---|
| | ⅛ inch (0.318 centimeter) Per minute) | ¼ inch (0.635 centimeter) per minute) | ¾ inch (1.91 centimeters) per minute) |

*The land 62 prefereably has a diameter approximately equal to the major scoring wheel diameter.

As can now be appreciated, the invention is not limited by the information of TABLE I.

Referring now to FIGS. 2 and 4, mounted downstream of the subsurface scoring device 38 is the open scoring device 44 for imposing the open score 46 in the opposite surface 48 of the glass ribbon 22. The term "open score" as used herein is a score that initiates at the surface of the ribbon contacted by the scoring wheel and extends into the body of the glass ribbon. Preferably, the open score terminates short of the zone of inner tension of the glass. This is because, if the open score were to extend into the inner tension zone, it could interact therewith and be pulled through the inner tension zone to the opposite compression zone. A discussion of this interaction is found in more detail in U.S. Pat. No. 4,289,261 which teachings are hereby incorporated by reference. If the open score 46 extends to the compression zone at the opposite glass surface, the bulb edge would be severed by the internal stress at the bulb edge. The resultant bulb edge could be jagged and/or uneven and require additional scoring and severing to provide a substantially smooth cut edge. Therefore, in the practice of the invention, it is recommended that the open score have a depth of about 3%–15% of the glass thickness and, preferably, the depth of the open score increases as the glass thickness increases to reduce bending moment forces required to sever the bulb edge.

With continued reference to FIGS. 2 and 4, the conventional scoring device 44 includes a scoring wheel 70 rotatably mounted on a shaft 72 captured in a housing or stem 74. The housing 74 is attached to piston end 76 of stationary ram or cylinder 78. In this manner, moving piston 80 out of the cylinder 78 moves the scoring wheel 70 toward and against the glass ribbon surface 48 to impose the open score 46 therein. Although not limiting to the invention, the scoring wheel 70 is preferably mounted about a doughnut roll 82 of the conveyor 30 for supporting the glass ribbon during the scoring operation.

Table II provides parameters that may be used for imposing an open score in glass ribbons or sheets of different thicknesses.

TABLE II

OPEN SCORING PARAMETERS
FOR GLASS THICKNESSES

| | GLASS RIBBON THICKNESS | | |
|---|---|---|---|
| | ⅛ inch (0.318 centimeter) | ¼ inch (0.635 centimeter) | ¾ inch (1.91 centimeters) |
| DIAMETER OF SCORING WHEEL | ⅛ inch (0.318 centimeter) | ¼ inch (0.635 centimeter) | ½ inch |
| SCORING ANGLE | 130° | 140° | 160° |
| SCORING FORCE | 4 pounds (1.8 kilograms) | 8 pounds (3.6 kilograms) | 100 pounds (45.36 kilograms) |
| SCORE DEPTH | 0.006 inch (0.152 millimeter) | .014 inch (0.356 millimeter) | .090 inch (2.286 millimeters) |

TABLE II-continued

OPEN SCORING PARAMETERS
FOR GLASS THICKNESSES

| | GLASS RIBBON THICKNESS | | |
|---|---|---|---|
| | ⅛ inch (0.318 centimeter) millimeter) | ¼ inch (0.635 centimeter) millimeter) | ¾ inch (1.91 centimeters) millimeters) |

There are no recommended ribbon speeds given since such speeds would be a function of the preferred speeds for subsurface scoring and further open scores are not related to ribbon speed. The information on Table II is not limiting of the invention.

Preferably, the open score 46 and subsurface score 40 are aligned with one another to provide a smooth, perpendicular cut edge. If the scores 46 and 40 are not aligned, the cut edge will be smooth and the plane containing the cut edge will be oblique to the plane containing ribbon surface 42 or 48. Further, it is preferred that the subsurface score 40 be imposed in the ribbon before the open score 46. This is because imposing the open score will not propagate the subsurface score, whereas imposing a subsurface score after the open score is imposed may result in pushing or propagating the open score deep into the glass ribbon. This pushing of the open score may be the result of the higher scoring forces and/or pinching of the glass ribbon between the scoring wheel 50 and land 62 during subsurface scoring.

With reference to FIGS. 1a and 1b, the ribbon 22 having the bulb edges 26 scored in accordance to the invention advances in the direction of the arrow 32 under a lateral or cross-scoring station 90 to impose a lateral score 92 in the ribbon. Further advancement of the ribbon moves it over lateral scoring opening station 94 to sever the lehr ends 24 from the ribbon. The scoring equipment at the lateral scoring station 90 is not limiting to the invention and may be any convenient type, e.g., of the type taught in U.S. Pat. Nos. 3,244,337; 3,800,991, 3,865,293; 3,865,294; and 4,057,183, which teachings are hereby incorporated by reference. The lateral score opening station 94 is not limiting to the invention and may be of the type including a lift roll 96 for raising the ribbon at lateral score 98 to sever same and, thereafter, the roll 96 is lowered as downstream conveying section 100 accelerates the lehr end to separate the trailing edge of the lehr end 24 from the leading edge of the ribbon 22 or next lehr end to prevent edge damage. A lateral cross-score opening station that may be used in the practice of the invention is taught in U.S. Pat. No. 3,142,427 which teachings are hereby incorporated by reference.

With reference to FIG. 1b, the lehr end 24 is further advanced downstream through a bulb edge removal station 102 which preferably applies a bending moment forces to the bulb edges 26 of the lehr end 24 to propagate the conventional score 46 into the subsurface score 40 to sever the bulb edge from the lehr end and provide a relatively smooth cut edge. As shown in FIG. 5, a member 104, e.g., of the type taught in U.S. Pat. Nos. 4,196,830 and 4,285,451, which teachings are hereby incorporated by reference, is conveniently mounted for reciprocal motion toward and away from the ribbon surface 48 having the conventional score 46. As the member 104 engages the bulb edge 26, it applies a biasing downward force. On the opposite side of the conventional score 46, the weight of the glass acts to prevent upward movement of the lehr end and the conveyor doughnut roll 82 acts as a fulcrum. The severed bulb edge from each side of the lehr end 24 falls into cullet chutes (not shown) and the glass piece 28 moves further downstream to the next work station, e.g., for stacking or further cutting. Preferably, the bending moments are applied about the open score which requires less bending moment forces to propagate than the subsurface score.

As can now be appreciated, the above example is presented for illustration purposes only and is not limiting to the invention. For example, the invention may be practiced on refractory materials other than glass, e.g., glass-ceramic and/or ceramics and may be practiced by scoring a continuous ribbon as discussed above or scoring a lehr end after it is severed from a glass ribbon. Further, the invention may be practiced on glass sheet at a portion other than at the bulb edge.

What is claimed is:

1. A method of severing a piece of refractory material having a first surface and a second opposed surface, comprising the steps of:
    imposing a first score in the piece, the first score not extending to either surface of the piece and being within the body of the piece at a location between the first surface of the piece and the centerline of the piece between the first and second surfaces; followed by
    imposing a second score in the piece, the second score being generated in the second surface of the piece and extending into the piece toward the first surface terminating short of the centerline between the first and the second surfaces and generally aligned with the first score; and
    applying bending moment forces about at least one of the scores to sever the refractory piece along the scores.

2. The method as set forth in claim 1 wherein said applying step is practiced by providing a force having force vectors in a first direction against the first score and a force on each side of the second score each having force vectors in a direction opposite to the first direction to sever the refractory piece along the scores.

3. The method as set forth in claim 1 wherein the refractory material is glass.

4. The method as set forth in claim 3 wherein the glass is a glass ribbon having a bulb edge and said imposing steps are practiced at the bulb edge.

5. The method as set forth in claim 4 wherein the glass ribbon advances along a movement path supported on the first surface and said imposing steps include the steps of:
    engaging the first surface of the glass ribbon with scoring means to impose the first score in the bulb edge of the ribbon; and
    engaging the second surface of the ribbon with score means to impose the second score in the bulb edge of the ribbon.

6. The method as set forth in claim 5 wherein the first score has a depth of about 25% of the ribbon thickness and the second score has a depth of less than about 20% of the ribbon thickness.

7. The method as set forth in claim 6 further including the step of:
    severing the ribbon to provide lehr ends.

8. The method as set forth in claim 7 further including the step of:
    applying a downward force to the edge of the lehr ends to propagate the second score to interact with the first score to sever the bulb edge from the lehr ends.

9. A method of severing a piece of refractory material having a first surface and a second opposed surface, comprising the steps of:
    imposing a first score in the piece, the first score being generated in the first surface of the piece and extending into the piece toward the second surface terminating short of the centerline between the first surface and second surface; followed by
    imposing a second score in the piece, the second score not extending to either surface of the piece and being within the body of the piece at a location between the second surface of the piece and centerline of the piece between the first and second surfaces and further being generally aligned with the first score; and
    applying bending moment forces about at least one of the scores to sever the refractory piece.

10. The method as set forth in claim 9 wherein said applying step is practiced by providing a force having force vectors in a first direction against the second score and a force on each side of the first score, each having force vectors in a direction opposite to the first direction to sever the refractory piece along the scores.

11. The method as set forth in claim 9 wherein the refractory material is glass.

12. The method as set forth in claim 11 wherein the glass is a glass ribbon having a bulb edge and said imposing steps are practiced at the bulb edge.

13. The method as set forth in claim 12 wherein the glass ribbon advances along a movement path supported on the second surface and said imposing steps include the steps of:
    engaging the second surface of the glass ribbon with scoring means to impose the second score in the bulb edge of the ribbon; and
    engaging the first surface of the ribbon to impose the first score in the bulb edge of the ribbon.

14. The method as set forth in claim 13 wherein the first score has a depth of less than about 20% of the ribbon thickness and the second score has a depth of about 25% of the ribbon thickness.

15. The method as set forth in claim 14 further including the step of:
    severing the ribbon to provide lehr ends.

16. The method as set forth in claim 15 further including the step of:
    applying a downward force to the edge of the lehr ends to propagate the first score to interact with the second score to sever the bulb edge from the lehr ends.

* * * * *